United States Patent [19]
Morse

[11] 3,762,505
[45] Oct. 2, 1973

[54] DEVICE FOR REDUCING SEVERITY OF IMPACT FORCES

[76] Inventor: Stephan L. Morse, 1802 Wright Ave., Rocky River, Ohio 44116

[22] Filed: Dec. 1, 1971

[21] Appl. No.: 203,636

[52] U.S. Cl............................. 188/1 C, 280/150 B
[51] Int. Cl............................................... F16f 7/12
[58] Field of Search........................ 188/1 C, 129; 280/150 B

[56] References Cited
UNITED STATES PATENTS

| | | |
|---|---|---|
| 2,961,204 | 11/1960 | Rayfield et al................. 188/1 C X |
| 3,198,288 | 8/1965 | Presunka............................ 188/1 C |
| 3,289,792 | 12/1966 | Moberg............................. 188/1 C |

Primary Examiner—Duane A. Reger
Attorney—Meyer, Tilberry & Body

[57] ABSTRACT

A device for distributing an impact force over an extended period of time includes a deformable plate for dissipating energy during deformation thereof. The plate has an aperture formed therein, and a rod having a longitudinal axis is received in the aperture. Impact loads applied to the rod transversely of its longitudinal axis cause the plate to deform beyond its elastic limit.

8 Claims, 12 Drawing Figures

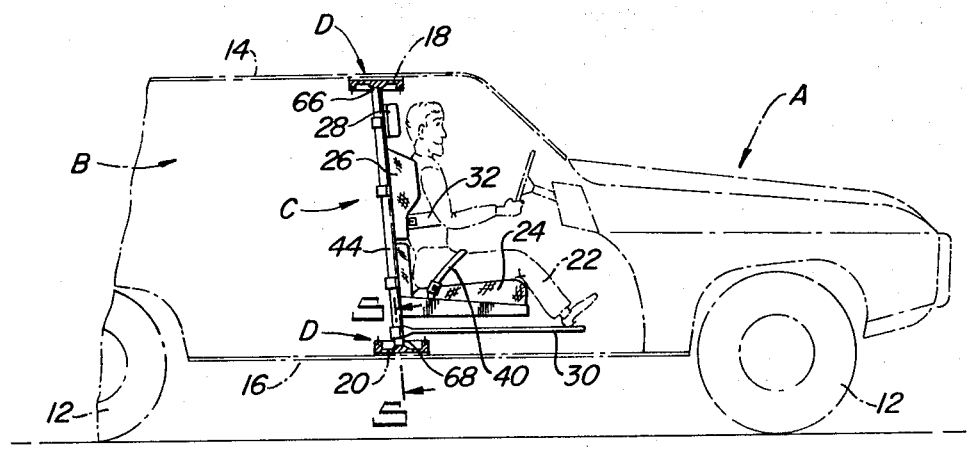
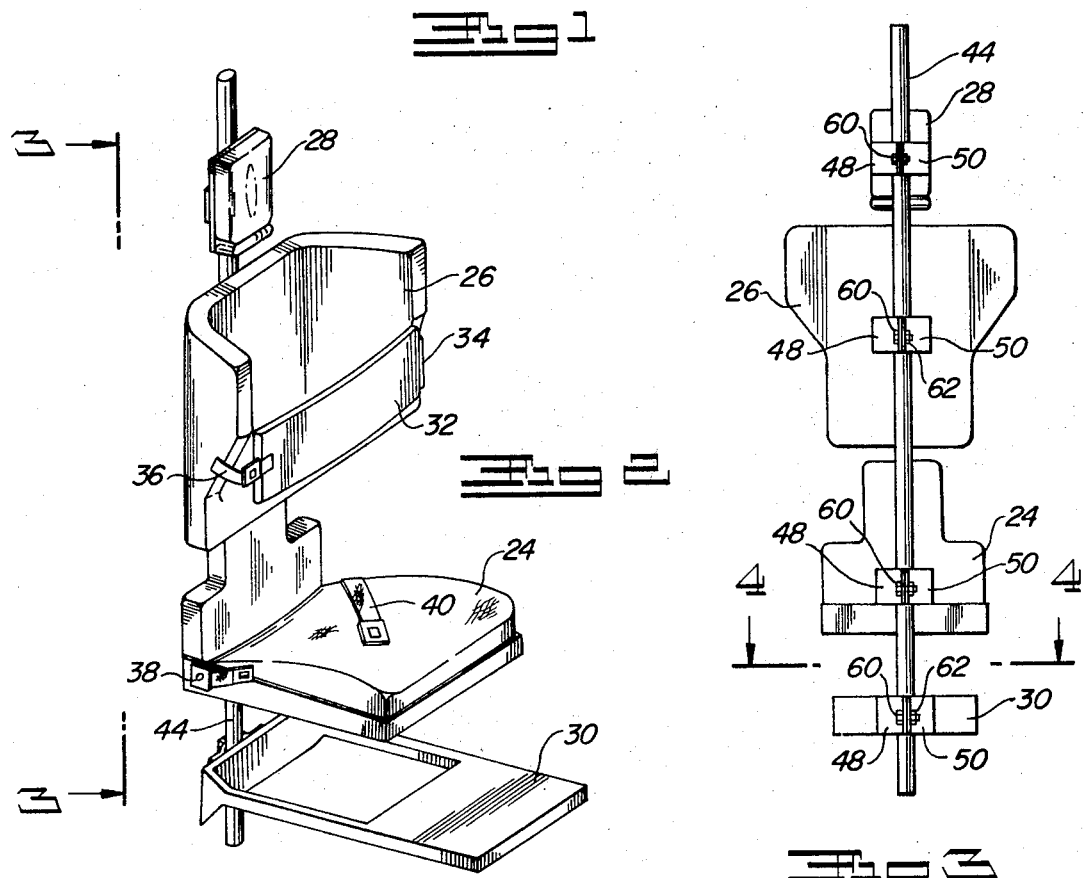
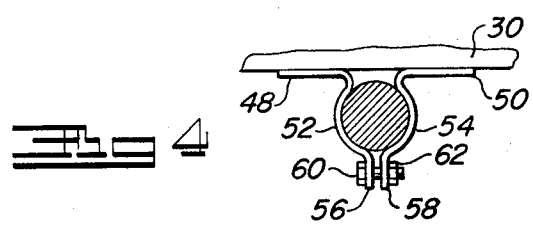

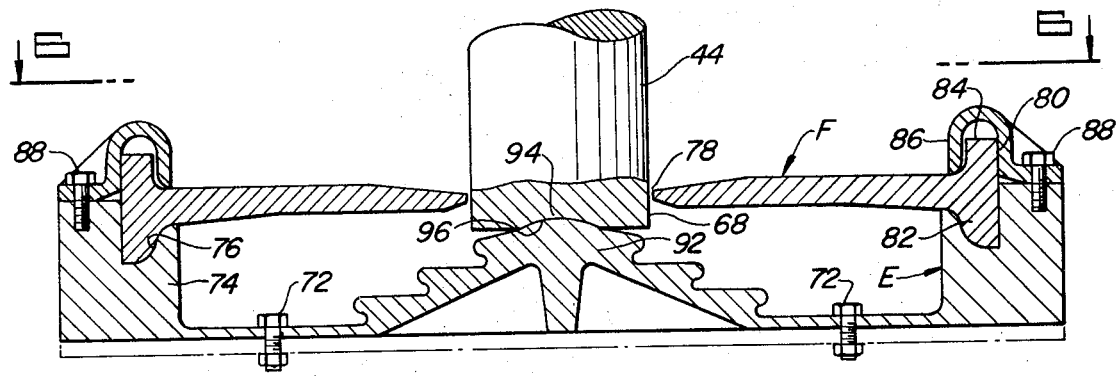
Fig. 5
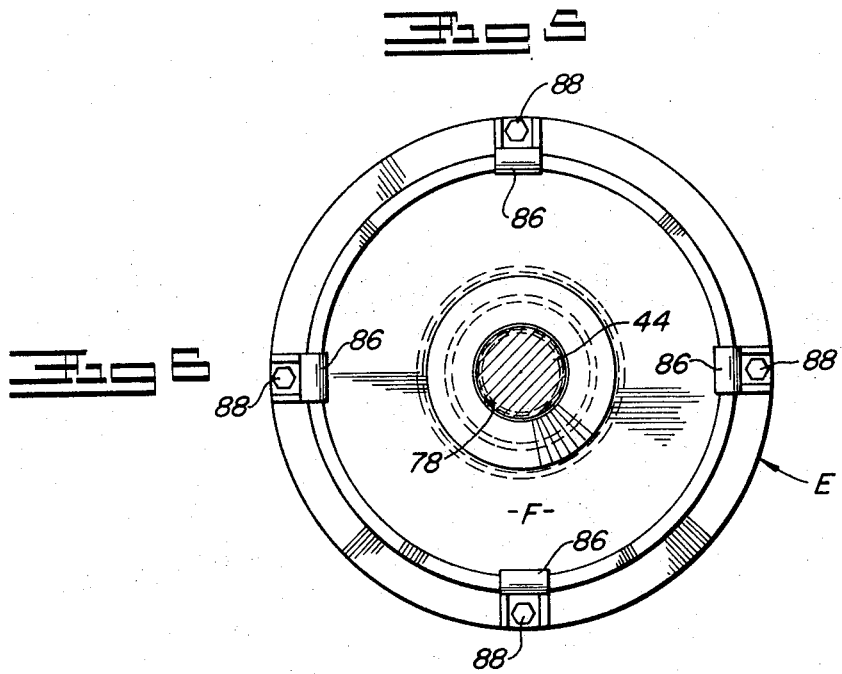
Fig. 6
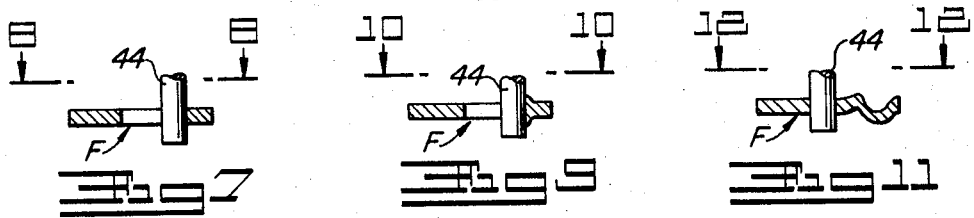
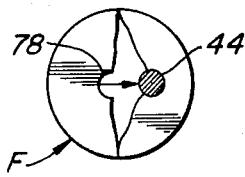
Fig. 7
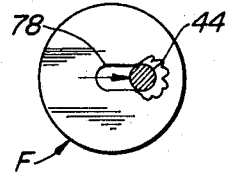
Fig. 9
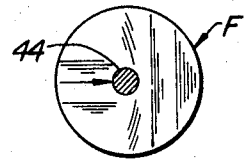
Fig. 11
Fig. 8
Fig. 10
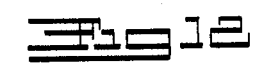
Fig. 12
INVENTOR.
STEPHAN L. MORSE
BY
Meyer, Tilberry & Body
ATTORNEYS

DEVICE FOR REDUCING SEVERITY OF IMPACT FORCES

BACKGROUND OF THE INVENTION

This application pertains to the art of force dissipation and more particularly to the art of distributing impact forces over extended periods of time in order to reduce the severity of an impact force. The invention is particularly applicable to a safety seat for human conveyances and will be described with particular reference thereto although it will be appreciated that the invention has broader applications and may be used in other environments such as on bumpers or guard rails.

In sudden impact situations involving human conveyances, such as an automobile accident, the extent and probability of injury to persons in the conveyance is substantially reduced if the persons are constrained in their seats during impact. Further reductions in the extent and probability of injury can be effected by minimizing the relative velocity between occupants of the conveyance and the vehicle interior. Maximizing the area of eventual contact between occupants of the conveyance and the vehicle interior also will reduce the extent and probability of injury. Other factors which influence the construction and design of impact absorbing seat assemblies include occupant comfort, ease of egress and ingress from the seat, a minimum of restraint on normal movement by the occupants and cost.

Particular attention has been directed in recent years to the problem of providing effective restraining means in impact situations for occupants of automobiles. Present and currently proposed devices for achieving desired occupant restraint possess certain disadvantages. Devices such as seat belts which require affirmative action by the occupant are frequently ignored by him and are totally ineffective. Other devices such as inflatable air bags are complex and expensive. The problem of providing effective restraining devices is further complicated by the wide range of variation in size and weight of vehicle occupants.

SUMMARY OF THE INVENTION

In accordance with the present invention, a device for distributing an impact force over an extended period of time in order to reduce the severity of the impact force includes a first structure defined by deformable plate means for dissipating energy during deformation thereof. A second structure defined by rod means having a longitudinal axis is received in an aperture in the plate means. An impact load receiving means is connected to one of the first and second structures for applying impact loads to the plate means in directions transverse to the longitudinal axis of the rod means. The plate means is deformable beyond its elastic limit by predetermined impact forces applied thereto.

In accordance with a preferred arrangement, the aperture means has a central axis and the plate means is substantially symmetrical about the central axis of the aperture means. In another arrangement, the plate means has an outer periphery and varies in thickness from the aperture means to the outer periphery thereof.

In a preferred arrangement, the rod means comprises a substantially upright pillar having opposite end portions and a deformable plate member is positioned at each of the opposite end portions of the pillar. A seat for an occupant of a conveyance is mounted on the pillar and may be adjustable for upward and downward movement relative to the pillar. Friction release means may be provided for holding at least one of the end portions of the pillar against movements. The friction release means is operated by a predetermined impact load on the pillar to release the one end portion of the pillar for movement transversely of its longitudinal axis to deform the plate.

It is a principal object of the present invention to provide an improved device for distributing impact forces over an extended period of time.

It is another object of the present invention to provide an improved device for reducing the severity of impact forces in a very simple and economical manner.

It is also an object of the present invention to provide a seat assembly for a conveyance wherein the seat assembly includes force absorbing means to minimize severity of impact forces.

It is an additional object of the present invention to provide a conveyance seat assembly which minimizes the relative velocity between an occupant and his environment during sudden impact situations.

It is a further object of the invention to provide a vehicular impact absorbing seat assembly which is comfortable and does not unduly restrict occupant freedom of movement.

It is also an object of the invention to provide a vehicular impact absorbing seat assembly which provides varying impact absorbing ability in accordance with the weight of the occupant and severity of impact, and from any direction transverse to the seat.

BRIEF DESCRIPTION OF THE DRAWING

The invention may take physical form in certain parts and arrangements of parts, a preferred embodiment of which will be described in detail in this specification and illustrated in the accompanying drawing which forms a part hereof.

FIG. 1 is a side elevational view showing an impact absorbing passenger seat assembly constructed in accordance with the present invention and with portions in section for clarity of illustration;

FIG. 2 is a pictorial showing of a seat assembly for use with the present invention;

FIG. 3 is a rear elevational view looking in the direction of arrows 3—3 of FIG. 2;

FIG. 4 is a cross-sectional view looking in the direction of arrows 4—4 of FIG. 3;

FIG. 5 is a cross-sectional elevational view looking in the direction of arrows 5—5 of FIG. 1;

FIG. 6 is a cross-sectional view looking in the direction of arrows 6—6 of FIG. 5;

FIG. 7 is a side elevational view showing one manner in which the plate used with the present invention may deform;

FIG. 8 is a plan view looking in the direction of arrows 8—8 of FIG. 7.

FIG. 9 is a side elevational view showing another manner in which the plate used with the present invention may deform;

FIG. 10 is a plan view looking in the direction of arrows 10—10 of FIG. 9;

FIG. 11 is a side elevational view showing another manner in which the plate used with the present invention may deform; and FIG. 12 is a plan view looking in the direction of arrows 12—12 of FIG. 11.

DESCRIPTION OF THE PREFERRED EMBODIMENT

Referring now to the drawings, wherein the showings are for purposes of illustrating a preferred embodiment of the invention only and not for purposes of limiting same, FIG. 1 shows a human conveyance A in the form of an automobile having wheels 12 for carrying conveyance A along a surface. Conveyance A includes a roof portion 14 and a floor portion 16. Conveyance A also includes side walls and doors, which cooperate with roof and floor portions 14 and 16, to define an enclosed space B to be occupied by persons using conveyance A. In a conventional manner, roof 14 of conveyance A includes a transverse reinforcing beam 18. Floor portion 16 of conveyance A also includes a transverse reinforcing beam 20.

An impact absorbing seat assembly C is mounted within conveyance A for protecting an occupant 22 of conveyance A. While conveyance A has been shown in the form of an automobile, it will be recognized that the improvements of the present invention may be utilized with any form of human conveyance and certain aspects of the invention may also be used for impact absorbing situations which do not relate to an occupant of a conveyance. Seat assembly C serves to both restrain and support occupant 22 of conveyance A. Seat assembly C includes a seat portion 24, a back rest portion 26, a head rest portion 28 and a foot rest 30. Seat back portion 26 is preferably contoured to provide both back and lateral support for an occupant. A chest restraint member 32 may be hinged at one side 34 thereof to seat back 26 and provided with latching means 36 at its opposite side for connection to the opposite side of seat back portion 26. Lap belts 38 and 40 are also anchored to the lower portion of seat back 26 or to seat portion 24.

Seat assembly C further includes an upright column or pillar 44. Seat 24, back rest 26, head rest 28 and foot rest 30 are all mounted on column or pillar 44. In one arrangement, each portion of the seat may be adjustably mounted on pillar 44. Clamping members 48 and 50 may be secured to the rear surfaces of seat portion 24, back rest portion 28, head rest portion 28 and foot rest 30. Clamping members 48 and 50 have arcuate portions 52 and 54 which fit around pillar 44. Flanges 56 and 58 have holes therethrough for receiving a bolt 60. A nut 62 received on bolt 60 when it has been placed through the holes in flanges 56 and 58 may be tightened to draw arcuate portions 52 and 54 toward one another and tightly clamp against pillar 44. With this arrangement, it is possible to adjust the seat or each individual component thereof upward and downward relative to pillar 44. It will be recognized that many other adjustable clamping arrangements may be provided for adjustably clamping the seat to pillar 44.

Pillar 44 has upper and lower end portions 66 and 68 mounted in devices D which are capable of distributing an impact force over an extended period of time in order to reduce the severity of the impact force. An automobile tends to nose downward when it is in a collision. Therefore, pillar 44 may be mounted at an angle to the vertical so that downward nosing of conveyance A during a collision will cause pillar 44 to assume a substantially vertical position. In one arrangement, pillar 44 may extend rearward from the vertical at an angle between 22° and 28°. When pillar 44 is described as being substantially upright or substantially vertical, it will be recognized that such terms include arrangements in which pillar 44 is mounted at a slight angle as described.

Each device D includes a mounting member E secured to beams 18 and 20 as by bolts 72. Mounting members E include a peripheral flange 74 having a circumferential contoured groove 76 therein. Plate means F in the form of a circular disc has a central aperture 78 therethrough and an outer periphery 80. The outer peripheral portion of plate F has a peripheral contoured flange 82 received in groove 76. An upstanding flange 84 is tightly clamped by U-shaped clamping members 86. Clamping members 86 are clamped to flange 74 of mounting members E as by bolts 88. A plurality of such clamping members 86 may be located at circumferentially spaced positions or may extend over a substantial arc to completely clamp the entire peripheral edges of discs F. Discs F are preferably of forged aluminum.

Upper and lower portions 66 and 68 of pillar 44 are snugly received through central apertures 78 in discs F. Under normal conditions, discs 44-F have sufficient strength to hold pillar 44 firmly in position. In an impact situation, sufficient force is applied to pillar 44 by the momentum of the seat assembly and an occupant on the seat to deform discs F. As shown in FIGS. 7–12, discs F may be deformed by tearing as shown in FIGS. 7 and 8; by intrusion and elongation of central hole 78 as shown in FIGS. 9 and 10; or by folding as shown in FIGS. 11 and 12. In any event, discs F are deformed beyond their elastic limit to dissipate the impact force and distribute that force over an extended period of time. Absorbtion of a portion of the impact force by deformation of discs F alters the impact force experienced by an occupant of the seat. When discs F are circular, it will be noted that the impact absorbing device is capable of absorbing the impacts regardless of the direction of impact. In addition, deformation of discs F beyond their elastic limit eliminates any recoil action. The diameter, thickness and contour of discs F may be selected so as to provide sufficient impact absorbing capacity to reduce the impact force transmitted to the seat occupant to a more acceptable level.

Discs F may be of varying thickness from central aperture 78 toward outer peripheries 80 to provide progressively greater impact absorbing capability. Such variable factors are affected by the weight of the occupant and by the magnitude of the impact forces expected. In a preferred arrangement, selection of the variable factors is made to provide the desired impact absorbing action for a range of impact forces and occupant weights.

When the impact absorbing seat assembly is used in automobiles or the like where there is a considerable range of occupants, extending from small children to large adults, it is possible that a disc having sufficient strength to provide adequate impact absorbing protection for an adult will not be deformed when a lighter person occupies the seat and will not provide adequate protection. In order to overcome this difficulty, friction release devices may be used to hold pillar 44 in its stable position until the impact force becomes potentially dangerous to the particular occupant of the seat. A friction release device for bottom portion 68 of pillar 44 may include a bearing plate 92 formed integral with mounting member E. Bearing plate 92 may have a rounded protuberance 94 received in a rounded recess 96 in the bottom end of pillar 44. Pillar 44 may then be loose in its upper mounting so that it can move vertically. The normal force with which surfaces 94 and 96 engage one another depends upon the weight of the person occupying the seat. Since the magnitude of the frictional force is proportional to the weight carried by pillar 44, the friction release arrangement will permit pillar 44 to move from its stable position under a lower impact force for a light occupant than for a heavier occupant. As a result, discs F can be designed within initial impact absorbing level sufficiently low to provide adequate protection for a light occupant. It will be recognized that many other types of friction release devices may be used.

When the seat is used in vehicles in which the direction of maximum impact is constant, a non-circular deformable plate may be used in place of a circular disc. In such an arrangement, a rectangular or oblong plate may be substituted for a circular disc. Such a rectangular or oblong plate may be mounted at its periphery to a conveyance frame with the principal axis of the plate aligned with the direction of maximum impact. The seat supporting pillar may be received in a centrally positioned hole in the plate in the same manner as the pillar is received in the hole in the disc. It will also be recognized that the plate or disc need not be plain and can be wrinkled or corrugated or have other shapes. Therefore, the use of the term plate includes other deformable plate-like members which may be corrugated or have other warped shapes. In the preferred arrangement, wherein discs F are circular to absorb an impact in any direction, discs F are substantially symmetrical about the central axis of holes 78. It will also be recognized that pillar 44 may be considered a rod means which applies impact loads to impact absorbing devices D. Impact loads are applied to discs F in directions transverse to the longitudinal axis of pillar 44.

In the preferred arrangement, pillar 44 extends freely through apertures 78 in discs F with a close sliding fit, and is not otherwise secured to discs F. This makes replacement of discs F very simple because they can simply be unbolted and removed from pillar 44. While this is the preferred arrangement, it will be recognized that pillar 44 can be welded or otherwise secured to discs F if the advantages of the preferred arrangement are not desired. With the preferred arrangement, pillar 44 can rotate about its longitudinal axis relative to discs F so that passengers have easy ingress and egress relative to vehicle A.

While forged aluminum has been mentioned as one material for discs F, it will be recognized that it is possible to use other metals or materials having properties which would render discs F suitably deformable to distribute an impact force over an extended period of time.

Although the invention has been described with reference to a preferred embodiment, it is obvious that equivalent alterations and modifications will occur to others skilled in the art upon the reading and understanding of this specification. The present invention includes all such equivalent alterations and modifications and is limited only by the scope of the claims.

Having thus described my invention, I claim:

1. A device for distributing an impact force over an extended period of time comprising; a first structure defined by deformable plate means for dissipating energy during deformation thereof, substantially centrally located aperture means formed in said plate means, said aperture means having a central axis and said plate means being substantially symmetrical about said central axis, a second structure defined by rod means having a longitudinal axis and being received in said aperture means, impact load receiving means connected to one of said first and second structures for applying impact loads to said plate means in directions transverse to said longitudinal axis, said plate means being deformable beyond its elastic limit by predetermined impact force applied thereto through said impact load receiving means from any direction transverse to said longitudinal axis.

2. A device for distributing an impact force over an extended period of time comprising; first structure means defined by a pillar having a longitudinal axis and opposite end portions, second structure means defined by a pair of deformable plates for dissipating energy during deformation thereof, each of said plates having an aperture therein, said plates being positioned at said opposite end portions with said opposite end portions received in said apertures, impact load receiving means connected to one of said first and second structure means for applying impact loads to said plates in directions transverse to said longitudinal axis of said pillar, said plates being deformable beyond their elastic limit by predetermined impact force applied thereto through said impact load receiving means.

3. The device of claim 2 wherein said aperture means has a periphery and further including friction release means holding at least one of said end portions of said pillar against movement in cooperation with said periphery of said aperture means, said friction release means being responsive to a predetermined impact load acting on said pillar to release said one end portion for movement transversely of said longitudinal axis.

4. The device of claim 2 wherein said seat means is adjustably mounted on said pillar for upward and downward movement relative to said pillar.

5. The device of claim 2 wherein each said aperture in said plates has a central axis and each said plate is substantially symmetrical about said central axis.

6. A device for distributing an impact force over an extended period of time comprising; deformable plate means for dissipating energy during deformation thereof, aperture means formed in said plate means, a substantially vertical pillar having a longitudinal axis and being received in said aperture means, impact load receiving means connected to said pillar for applying impact loads to said plate means through said pillar in directions transverse to said longitudinal axis of said pillar, said plate means being deformable beyond its elastic limit by predetermined impact force applied thereto through said pillar and impact load receiving means, said pillar having opposite end portions, friction release means holding at least one of said end portions against movement, said friction release means being operated by a predetermined impact load on said impact load receiving means to release said one end portion for movement transversely of said longitudinal axis.

7. The device of claim 6 wherein said one end portion of said pillar comprises a bottom end portion, said friction release means including a rounded protuberance, said bottom end portion of said pillar having a rounded recess receiving said protuberance.

8. A device for distributing an impact force over an extended period of time comprising; deformable plate means for dissipating energy during deformation thereof, aperture means formed in said plate means, a substantially upright pillar having a longitudinal axis and being received in said aperture means, impact load receiving means connected to said pillar for applying impact loads to said plate means through said pillar in directions transverse to said longitudinal axis of said pillar, said plate means being deformable beyond its elastic limit by predetermined impact force applied thereto through said pillar and impact load receiving means, and said impact load receiving means comprising seat means adjustably mounted on said pillar for upward and downward movement relative to said pillar.

* * * * *